May 20, 1958     M. E. STEEVES     2,835,023

TOOL HOLDERS

Filed Aug. 31, 1954

INVENTOR

Martin E. Steeves

BY *Jr̃o. R. Nielsen*

ATTORNEY

United States Patent Office
2,835,023
Patented May 20, 1958

2,835,023

TOOL HOLDERS

Martin E. Steeves, Barberton, Ohio

Application August 31, 1954, Serial No. 453,367

10 Claims. (Cl. 29—96)

This invention relates to tool holders, i. e., elongated bars mounted as cantilever beams with one end secured in a tool post and the free end carrying bit or tool for cutting operations on metal, such as the turning and particularly the boring of rolls or cylinders. In use the bars are subjected to bending forces created by the pressure of the work on the cutting bit that result in vibrations of the tool holder to limit the accuracy of a cutting or boring operation; these forces vary with the nature of the metal and the depth of the cut, and they are customarily minimized by reducing the length of the holder and positioning it favorably to the work. Fluctuations in these forces or applied stresses impose corresponding variations in the strains, i. e., deformations in size or shape of the bar or holder; and the inherent elasticity of the tool steel, of which the bar is made, acts within the elastic limit toward restoring the bar to its original size or shape as the external stresses are lessened or released. The result is that, when the fluctuations or vibrations become pronounced, as in a boring operation—where the holder is in an unfavorable position for minimizing the vibrations and of a length fixed by the depth of the desired bore—and particularly in the boring of chilled iron having hard particles present in the structure, there follows an objectionable flexing or chattering of the bar and a consequent unevenness in the cut surface; these vibrations extend generally over an arc of not more than about one degree and are felt by placing a hand on the holder.

The flexings or bendings occur along the length of the bar or holder and result in strains characterized by a tension having a maximum value in the surface layer of greatest convexity, decreasing to zero at the neutral line, and becoming a compression with its greatest value in the surface layers of greatest concavity; the strains thus induced set up a resisting moment in opposition to that of the external bending stresses creating them. But it has been observed that, if a bar be in a state of imposed strain—preferably to a degree approaching but remaining less than the elastic limit of the metal composing the bar—flexing or chattering is correspondingly reduced and can even be substantially eliminated. It is upon this observation that the present invention is based.

The invention attains its objective by a permanent locking in a tool holder of strains to offer a resisting moment to bending or flexing Briefly, this is accomplished through the medium of two or more bars that are individually and differentially in states of strain operative in the plane of applied flexure when secured to each other in lengthwise juxtaposition by welding or equivalent means. These strains are most conveniently induced by differential heating of the bars or by a selection of bars of metals having different thermal coefficients of expansion, or by a combination of both; mechanical strain-inducing means can be substituted for heating or both used in combination. Upon the welding or securing of the bars to each other, and then cooling when heat is used, the bars have locked in them different states of strain, reducing to a tension in one bar and a compression in another.

In order that the invention may be described and understood, attention is directed to the accompanying drawing, in which Fig. 1 is an elevation of a tool bar, showing in dotted lines a work piece operated upon by a cutting bit in the holder bar and a tool post in which the holder is mounted, with lines of force (not to scale) indicated thereon;

Figure 1:
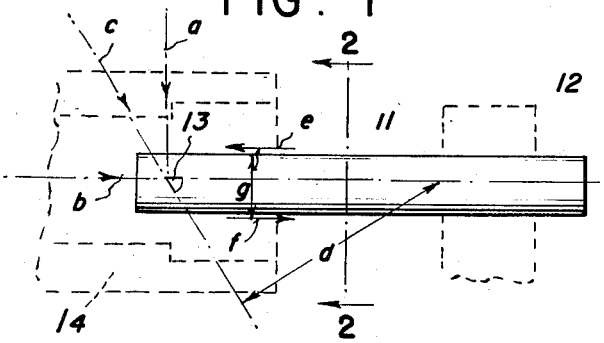
Figure 2:
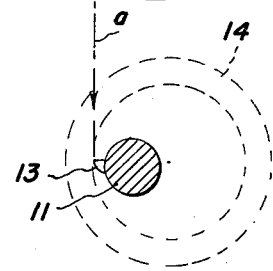
Fig. 2 is a cross-section on line 2—2 of Fig. 1.

Figs. 1 and 2 of the drawing illustrate diagrammatically the major forces acting in a boring operation upon a tool holder, the holder 11 being mounted in a tool post 12 and the cutter 13 operating on a work piece 14; the post 12 and the work piece 14 are shown in dotted lines. In the boring operation there is a downward force component $a$ acting on the cutting bit 13 as shown in Fig. 2, and there is also a longitudinal component $b$ supplying with the force $a$ the resultant force $c$ acting at an angle through the moment arm $d$ as shown in Fig. 1. The force $c$ through its moment arm $d$ tends to bend the tool holder and thus create a longitudinal tension $e$ in the upper layer and a longitudinal compression $f$ in the lower layer of the holder; these internal forces operate through a moment arm $g$ in opposition to the external force $e$.

Figure 3:
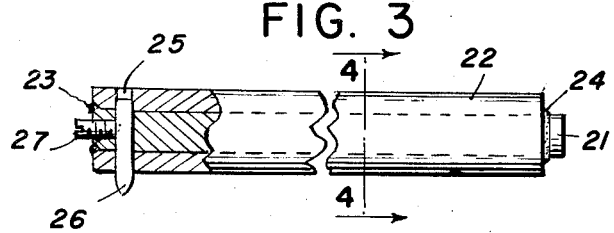
Fig. 3 is a side elevation of one embodiment of a holder, broken and partly in section.
Figures 4, 7:
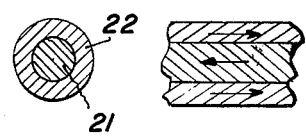
Fig. 4 is a cross-section on the line 4—4 of Fig. 3.
Fig. 7 is a fragmentary longitudinal section illustrating the induced stresses in the foregoing embodiments.

Figs. 3 and 4 illustrate the original embodiment of the invention as a holder consisting of a rod 21 snugly fitting within a concentric sleeve 22 of metals having different thermal coefficients of expansion; specifically, the rod was of Allegheny steel (coefficient $9.5 \times 10^{-6}$) and the enclosing sleeve of a nickel alloy (coefficient $7 \times 10^{-6}$). The rod and sleeve were welded at one end 23, the rod thereupon heated by means of an acetylene torch, and the two parts were then welded together at the opposite end 24. A drilled opening 25 received a cutting bit 26 and set screws 27 served to secure the bit. Such a holder, in comparison with a stainless steel bar of the same diameter, was found upon trial to improve the accuracy of the cut about 20 percent.

Figure 5:
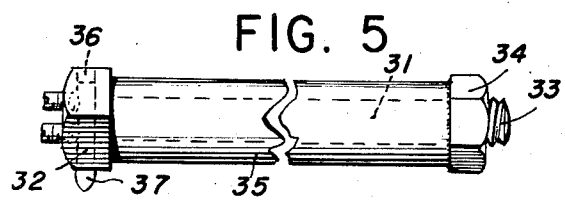
Fig. 5 shows in side elevation another embodiment of the invention.

A mechanical means for applying differential stresses in the rod and sleeve is shown in Fig. 5. In this form the rod is a bolt 31 with a head 32 at one end and threaded at the other end 33 to receive a nut 34; the bolt is slipped within a sleeve 35, the nut applied and tightened, and the head 32 has a hole 36 to receive a cutting bit 37. By the tightening action the sleeve is compressed and the bolt placed under tension; the nut can be permanently secured against turning by peening or welding. Along with the mechanical means may be employed preheating of the bolt, whereby the assembled structure has strains induced in the cooling.

Figure 6:
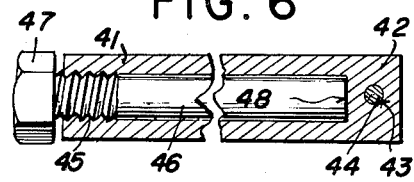
Fig. 6 is a longitudinal cross-section of a modification of the embodiment shown in Fig. 5.

A reversal of the strains in the bolt and the sleeve is obtained by the modification shown in Fig. 6. In this form the sleeve 41 has an integral section 42 at one end, which for example can be welded to the sleeve; the end 42 is drilled as at 43 to receive a cutting bit 44. The open end 45 of the sleeve is internally threaded to receive a partially threaded bolt 46 with the head 47; the end 48 of the bolt contacts and presses the solid end 42 when the bolt is screwed into the sleeve. This construction places the sleeve under tension and the bolt under compression.

Experience has shown, however, that the foregoing embodiments are not effective to the extent which has since been found possible. As shown in Fig. 1, the external bending forces induce the maximum strains in the outside layers of the holder lying in the plane of bending, one being under tension and the other under compression. With the concentric rod and sleeve construction, however, the outside layers are both in the same condition of pre-strain, either in tension or compression, and accordingly the resisting moment to bending, i. e. the moment arm $g$, is much less than if the outside layers were in opposite conditions of strain; the diagram of Fig. 7 illustrates the pre-strains as existing in the foregoing embodiments.

Figure 8:
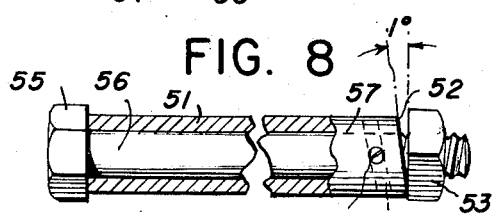
Fig. 8 is another modification of the embodiment of Fig. 5.

A means of obtaining differential strains in the plane of applied stresses in the outside layers of a rod and sleeve structure by mechanical means is shown in the modification of Fig. 8. In this form the sleeve 51 is provided with a taper 52 at one or both ends. Upon tightening the nut 53 on the bolt 54, the compression of the sleeve between the nut 53 and the bolt head 55 is greatest on the longer outside layer 56 and least on the shorter layer 57 of the sleeve; the result is a strain differential in the two layers. As the arc of vibration is about one degree, a taper of that extent is indicated. The tool bit hole 58 adjacent the nut end 53 of the holder is drilled at an angle paralleling the taper, and set screw 59 secures the bit.

Figure 9:
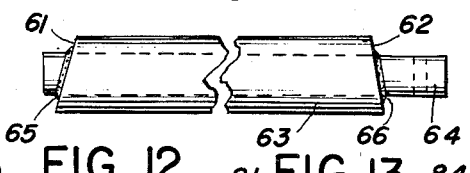
Fig. 9 shows the modification of Fig. 8 applied to the embodiment of Fig. 3.

In the foregoing embodiment of Fig. 8, however, there appears to be an inherent tendency of the metal on the high side of the sleeve to be worked by the friction developed in the tightening of the bolt until the sleeve becomes one of uniform length; hence it is not a desirable form. A modification, similar to that of Fig. 8, is shown in Fig. 9, which illustrates both ends 61 and 62 of a sleeve 63 as tapered; in this form the rod 64 and the sleeve 63 are differentially stressed by heating, as in the embodiment of Fig. 3, and the ends 65, 66 are then welded. The tapered ends result in differential strains in the outer layers of the sleeve, and they are effective to the degree that flexing of the structure results instead of a flattening endwise of the longer sleeve portion to correspond to the length of the shorter portion. By means of the tapered ends it has been found that the vibrations or chattering can be reduced to about one-half of those resulting with the perpendicular ends of the embodiment of Fig. 3.

Figure 10:
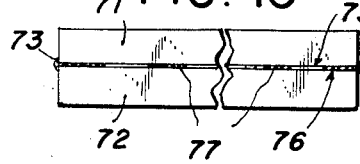
Fig. 10 is a side elevation of a two-bar embodiment of the invention.
Figures 11, 12:
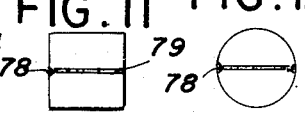
Fig. 11 is an end view of Fig. 10.
Fig. 12 is an end view of a modification of Fig. 10.

A simple embodiment of the invention that provides opposing strains in the outer longitudinal layers of a tool holder in the plane of stress is illustrated in Fig. 10. Here the invention takes the form of a pair of parallel bars 71, 72 of any convenient cross-section, as rectangular as shown in Fig. 11 or semi-circular as shown in Fig. 12. These bars are in states of differential strains after being secured together as by welding, whereby one bar serves to lock the imposed strains in the other. The strains can be induced by differential heating, as in the embodiment of Fig. 3, and preferably by heating bars of metals having different thermal coefficients of expansion; while in these conditions of different strains, the bars are welded together at the ends 73, 74 and preferably also along their lengths at the meeting edges 75, 76 either continuously or in spots 77. For the purpose of welding, the edges are preferably chamfered as at 78 so that after welding the weld 79 can be ground flat with the sides to remove any projections. The locked-in longitudinal strains, being different, cause a resulting tension along one bar and a compression along another, and these resulting strains of tension and compression act to complement each other in causing some curvature or distortion of the compound bar; the strains, however, are not thereby discharged but remain to create the condition of opposition to flexure or bending by the external forces. Accordingly, while end-welding alone may suffice to lock the strains, it is preferred to weld the sides as well so as to insure continuity of the structure and maintenance of the maximum opposition to flexure along the length under the variable action of the applied forces that occur in a cutting operation.

Figure 13:
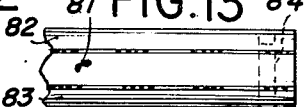
Fig. 13 shows in side elevation a three-bar structure.
Figure 14:
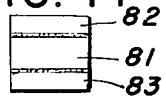
Fig. 14 is an end view of Fig. 13.

In such a two-bar structure, however, the opposing forces are set up along the joining surfaces to cancel each other and give a neutral axis, and the integrated moment across the structure depends on the stress distribution on each side of the axis with the stresses diminishing with the distance from the neutral axis. As stated in the beginning of this description, the external bending forces reach their maximum effects in the outer layers that lie in the plane of the bending forces, the effect being nil along the neutral axis. It has been found that a much more effective resistance to flexure is obtained with a three-bar structure having a separating middle bar, illustrated in Fig. 13, and each bar of metal having a different thermal coefficient of expansion. Specifically, a structure was built up of a middle bar 81 of cold-rolled steel (coefficient $6.5 \times 10^{-6}$) with a stainless steel bar "304" as 82, on one side, (coefficient $9.5 \times 10^{-6}$) and a stainless steel "416" bar 83 (coefficient $5.7 \times 10^{-6}$) on the other side; these were heated and assembled, and in their heated condition were welded at the ends and along the sides as shown. The holder was drilled at one end 84 to receive a cutting bit 85. By comparative tests, consisting of hanging a 60 pound weight at the free ends of the holders, all of the same effective depth, and measuring the resulting curvatures, the three-bar holder with the locked-in stresses was found to be about 3.5 times more resistant to flexing than the rod-and-sleeve holder of Fig. 3 and about two times as resistant as the two-bar holder of Fig. 10.

Figures 15, 16, 17:
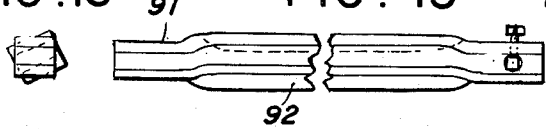
Fig. 15 shows a modification of Fig. 13.
Fig. 16 is one end view of Fig. 15.
Fig. 17 is the other end view of Fig. 15.

As shown in Fig. 2, the axis of the tool holder and that of the work seldom coincide, and accordingly there may be a resulting moment arm that tends to cause a twist or torsion of the holder due to the downward force $a$; but, as actual measurements show the twisting to be slight—less than one degree—and as the longitudinal bending of the holder by the external forces is not relieved by the twisting or torsion, the resistance to longitudinal bending by the locked-in rigidity becomes the primary factor in obtaining the improved results. Since the ultimate resultant of the forces applied to the tool holder has for its components the resultant of both downward and sideways forces, however, and in order to best utilize the resistance of the imposed rigidity, it is preferred to either turn or give a twist to the holder in order to present the major components of resistance forces in a plane transverse to that in which the maximum downward bending thrust is apt to occur; such an angular turn of the holder by twisting is preferably accomplished by twisting the component bars before heating and welding. This construction is illustrated in Figs. 15, 16 and 17, wherein a three-bar holder 91 of square cross-section has its main effective length 92 turned to the appropriate angle as shown in the end view 16. A three-bar holder of circular cross-section is turned in the tool post to the most effective angle and secured, and the hole for the bit is drilled accordingly.

This application is a continuation-in-part of an application Ser. No. 225,474 filed May 10, 1951.

What is claimed is:

1. Tool holder for a cutting bit and extending from a tool post of a lathe or the like and subject to longitudinal flexing in use comprising in combination a rod and a sleeve coextensive in length with and encircling the rod, said sleeve having a tapered end to provide a differential length in the outer layers thereof, and means connecting said rod and said sleeve to each other for locking them in the plane of applied flexing in states of differential longitudinal strains of a substantial degree but short of their elastic limit.

2. Tool holder for a cutting bit and extending from a tool post of a lathe or the like and subject to longitudinal flexing in use comprising in combination bars coextensive in length and superposed in the plane of applied flexing, and means connecting said bars to each other for locking them in the plane of applied flexing in states of differential longitudinal strains of a substantial degree but short of their elastic limit.

3. Tool holder for a cutting bit and extending from a tool post of a lathe or the like and subject to longitudinal flexing in use comprising in combination bars coextensive in length and superposed in the plane of applied flexing, said bars being welded to each other for locking them in the plane of applied flexing in states of differential longitudinal strains of a substantial degree but short of their elastic limit.

4. Tool holder for a cutting bit and extending from a tool post of a lathe or the like and subject to longitudinal flexing in use comprising in combination a plurality of bars of coextensive length including a medial bar and outer bars superposed in the plane of applied flexing; said bars being in states of differential longitudinal strains in the plane of applied flexing of substantial degree but short of the elastic limit of the members; said bars being welded to each other for locking said states of strain in the bars.

5. Tool holder according to claim 4, having its main effective length turned at an angle to the cutting plane.

6. Tool holder of the type for extending freely from a tool post of a lathe or the like comprising in combination an elongated metal sleeve, a metal stem snugly received through said sleeve, circumferential means rigidly attaching said stem to opposite ends of said sleeve, said stem and sleeve being under longitudinally opposed compressive and tensile stresses of predetermined substantial degree short of the lastic limit of the materials thereof and locked in said states of stress by the said attaching means, and means independent of said attaching means for removably mounting a cutter bit on the tool holder to be at the freely extending end thereof.

7. Tool holder of the type extending freely from a tool post of a lathe or the like comprising in combination an elongated metal member and a second member longitudinally coextensive therewith, means rigidly attaching said members to each other at opposite ends coextensive with the contacting edges at said ends of said members, said attached members being under a state of longitudinally opposed stresses of predetermined substantial degree short of the elastic limit of the materials of the members and locked in said states of stress by said attaching means, and means independent of said attaching means for removably mounting a cutter bit on the tool holder to be at the freely extending end thereof.

8. A method of making a toolholder of the type adapted to extend freely from the tool post of a lathe or the like, comprising the steps of providing parts including an elongated metal sleeve and a metal stem snugly receivable therethrough, conditioning said parts by heating one and maintaining the other relatively cool to provide a differential expansion whereby the parts upon return to normal temperature will be under longitudinally opposed compressive and tensile stresses of substantial degree short of the elastic limit of the metals, inserting said stem in the sleeve and welding the stem and sleeve together at opposite ends of the tool holder while the same are in said conditions of differential expansion, cooling the tool holder, and cutting a tool bit mounting aperture at the free end of the holder.

9. A method of making a tool holder of the type adapted to extend freely from the tool post of a lathe or the like, comprising the steps of providing coextensively mating elongated metal parts, conditioning said parts by differentially heating one with respect to the other to provide a differential expansion, fixedly attaching the parts together at opposite ends of the tool holder with the parts assembled in said conditions of differential expansion, cooling the tool holder to normal temperature, and cutting a tool bit aperture at the free end of the tool holder.

10. A method of making a tool holder of the type adapted to extend freely from the tool post of a lathe or the like, comprising the steps of heating a metal stem to expand the same lengthwise, inserting said heated stem in a sleeve which is in a relatively cool contracted state, affixing opposite ends of the sleeve to the stem while respectively in expanded and relatively contracted condition, and allowing the holder to cool whereby the stem is placed under tensional strain between the affixed opposite ends and the sleeve is placed under opposed compressional strain.

References Cited in the file of this patent

UNITED STATES PATENTS

| | | |
|---|---|---|
| 271,614 | Edison | Feb. 6, 1883 |
| 1,309,163 | Walpole | July 8, 1919 |
| 1,636,057 | Jones | July 19, 1927 |
| 2,356,045 | Fullen | Aug. 15, 1944 |
| 2,533,254 | Whigans | Dec. 12, 1950 |